(12) United States Patent
Saila (10) Patent No.: US 7,787,912 B2
(45) Date of Patent: Aug. 31, 2010

(54) PORTABLE ELECTRONIC DEVICE WITH DOUBLE ACTING HINGE ARRANGEMENT

(75) Inventor: Sami Saila, Halikko (FI)

(73) Assignee: Nokia Corporation, Espoo (FI)

( * ) Notice: Subject to any disclaimer, the term of this patent is extended or adjusted under 35 U.S.C. 154(b) by 809 days.

(21) Appl. No.: 11/604,126

(22) Filed: Nov. 22, 2006

(65) Prior Publication Data

US 2008/0137271 A1   Jun. 12, 2008

(51) Int. Cl.
*H04M 1/00* (2006.01)
*H04B 1/38* (2006.01)

(52) U.S. Cl. ............... 455/575.1; 455/575.6; 455/90.3; 455/550.1

(58) Field of Classification Search .............. 455/550.1, 455/575.1, 575.3, 575.8, 90.3, 575.6; 379/433, 379/434; D14/248
See application file for complete search history.

(56) References Cited

U.S. PATENT DOCUMENTS

| | | | | |
|---|---|---|---|---|
| 1,944,696 A | | 10/1933 | Reichl .......................... 45/106 |
| 3,501,800 A | | 3/1970 | O'Dea .......................... 16/150 |
| 4,163,303 A | | 8/1979 | Hanna .......................... 16/135 |
| 4,558,911 A | | 12/1985 | Ruoff ............................ 339/5 |
| 4,969,180 A | * | 11/1990 | Watterson et al. .......... 379/56.1 |
| D318,275 S | * | 7/1991 | Benjelloun ................. D14/148 |
| D322,609 S | * | 12/1991 | Patton ....................... D14/218 |
| 5,410,779 A | | 5/1995 | Esman et al. ................. 16/370 |
| D364,641 S | * | 11/1995 | Osterhout ................... D19/36 |
| 5,692,046 A | | 11/1997 | Jambhekar ............. 379/433.13 |
| 5,732,757 A | | 3/1998 | Mariol ........................ 160/135 |
| 5,754,645 A | * | 5/1998 | Metroka et al. ........ 379/433.12 |
| 6,048,585 A | | 4/2000 | Martyak et al. .......... 427/433.1 |
| 6,101,402 A | * | 8/2000 | Bartha et al. ............. 455/569.1 |
| 6,292,562 B1 | * | 9/2001 | Badarneh ................ 379/433.07 |
| 6,405,029 B1 | * | 6/2002 | Nilsson ....................... 455/409 |
| D491,542 S | * | 6/2004 | Chai et al. ........... D14/138 AA |
| 6,788,551 B2 | * | 9/2004 | Takagi ......................... 361/814 |
| 6,901,245 B1 | * | 5/2005 | Boyle ........................ 455/90.3 |
| D514,078 S | * | 1/2006 | Rookard ................. D14/138 R |
| 7,076,272 B2 | * | 7/2006 | Ikeda et al. ............... 455/556.1 |
| 7,349,216 B2 | * | 3/2008 | Silverbrook et al. ........ 361/715 |
| 7,509,094 B2 | * | 3/2009 | Moran et al. ................ 455/41.2 |
| 7,558,057 B1 | * | 7/2009 | Naksen et al. .......... 361/679.56 |
| 2002/0065104 A1 | * | 5/2002 | Hess et al. ................... 455/557 |
| 2002/0154475 A1 | | 10/2002 | Lammintaus et al. ....... 361/683 |
| 2004/0212956 A1 | | 10/2004 | Kuivas et al. ............... 361/683 |
| 2004/0229645 A1 | * | 11/2004 | Montgomery ............ 455/556.1 |
| 2006/0089182 A1 | * | 4/2006 | Gartrell .................... 455/575.3 |
| 2006/0148541 A1 | | 7/2006 | Vance | |

FOREIGN PATENT DOCUMENTS

| | | |
|---|---|---|
| AT | 165 425 B | 2/1950 |
| AU | 2006 100 021 A4 | 2/2006 |
| DE | 43 11 222 A1 | 10/1994 |
| EP | 0 612 904 A2 | 8/1994 |
| EP | 1 659 764 A1 | 5/2006 |

(Continued)

*Primary Examiner*—Tilahun Gesesse
(74) *Attorney, Agent, or Firm*—Harrington & Smith (57) ABSTRACT

A hand-held portable electronic device including a housing having a first housing section and a second housing section; electronic circuitry in the housing; and a Jacob's Ladder flipping hinge arrangement connecting the first and second housing sections to each other.

32 Claims, 7 Drawing Sheets

FOREIGN PATENT DOCUMENTS

| | | |
|---|---|---|
| FR | 1 030 268 | 6/1953 |
| GB | 2 189 290 A | 10/1987 |
| GB | 2 203 190 A | 10/1988 |
| GB | 2 254 881 A | 10/1992 |
| GB | 2 363 821 A | 1/2002 |
| JP | 2001262747 A | 9/2001 |
| JP | 2006-166293 | 6/2006 |

\* cited by examiner

PORTABLE ELECTRONIC DEVICE WITH DOUBLE ACTING HINGE ARRANGEMENT

BACKGROUND OF THE INVENTION

1. Field of the Invention

The invention relates to a hinge arrangement for a portable electronic device and, more particularly, to a double acting hinge arrangement.

2. Brief Description of Prior Developments

A Jacob's Ladder is a folk toy consisting of blocks of wood held together by strings or ribbons. When the ladder is held at one end, blocks appear to cascade down the strings. However, this effect is a visual illusion which is the result of one block after another flipping over. A Jacob's Ladder is usually constructed of six wood blocks. Each block is connected to the adjacent blocks by a Jacob's Ladder flipping hinge arrangement which depends on a counterintuitive arrangement of interlaced ribbons which allow each block to act as if hinged to the next one at either of its two ends. The same mechanism is used in the 1980s toy Rubik's Magic but with plastic strings run diagonally across squares, with the result that the squares can hinge along either of two adjacent sides.

Portable electronic devices, such as mobile telephones for example, have been known to have a flip type of configuration, such as a clam-shell design for example. The cover of the telephone is flipped open about 165 degrees from a closed position. This is often called a flip phone. U.S. Patent Publication No. 2004/0212956, which is hereby incorporated by reference in its entirety, discloses a mobile terminal with a hinge that allows two housing sections to flip about 360 degrees relative to each other. It is known to use electrical flat flexible cable through a hinge of a flip phone as illustrated in U.S. Patent Publication No. 2004/0212956 to electrically connect components in the two housing sections. It is also known to provide mobile telephones with other functionalities, such as a camera, or a music player, or a game player for example.

Usually, a multi-functionality product is either a camera, a phone, etc., one at a time. However, the controls for these different functionalities are visible at the same time, such as controls for a camera functionality and controls for a phone functionality for example. This can confuse users.

There is a desire to provide a new type of portable electronic device which can be reconfigured into different types of form factor configurations and avoid the confusion noted above.

SUMMARY OF THE INVENTION

In accordance with one aspect of the invention, a hand-held portable electronic device is provided including a housing having a first housing section and a second housing section; electronic circuitry in the housing; and a Jacob's Ladder flipping hinge arrangement connecting the first and second housing sections to each other. In alternate embodiments the hand-held portable electronic device could have more than two housings.

In accordance with another aspect of the invention, a hand-held portable electronic device is provided comprising a first housing section having electronic circuitry; a second housing section; and a double acting hinge arrangement connecting the second housing section to the first housing section. The double acting hinge arrangement comprises a ribbon mechanically connecting the first and second housing sections to each other.

In accordance with another aspect of the invention, a hand-held portable electronic device is provided comprising a housing comprising a first housing section and a second housing section; electronic circuitry in the housing; and at least three ribbons mechanically connecting the first and second housing sections to each other. At least one of the ribbons comprises an electrical flat flexible cable connected to the electronic circuitry. The ribbons allow the first and second housing sections to be flipped about 360 degrees relative to each other at two spaced hinge locations between a first form factor operational configuration and a second form factor operational configuration. Thus, the first and second housing sections can be flipped about 720 degrees relative to each other; 360 degrees at each spaced hinge location. In an alternate embodiment an electrical cable connection might not be provided; such as with an optical connection between the electronics in the housing sections.

In accordance with another aspect of the invention, a method of reconfiguring a hand-held portable electronic device is provided comprising flipping a first housing section of a housing about 360 degrees relative to a second housing section of the housing at a first end of the housing from a first form factor operation position to an intermediate position; and flipping the first housing section relative to the second housing section at a second end of the housing about 360 degrees from the intermediate position to a second form factor operational position.

In accordance with another aspect of the invention, a method of assembling a hand-held portable electronic device is provided comprising connecting a first housing section to a second housing section by a first ribbon; and connecting a second ribbon and a third ribbon to the first and second housing sections on opposite sides of the first ribbon, wherein the first ribbon is located on opposite major sides of the first and second housing sections than the second and third ribbons.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
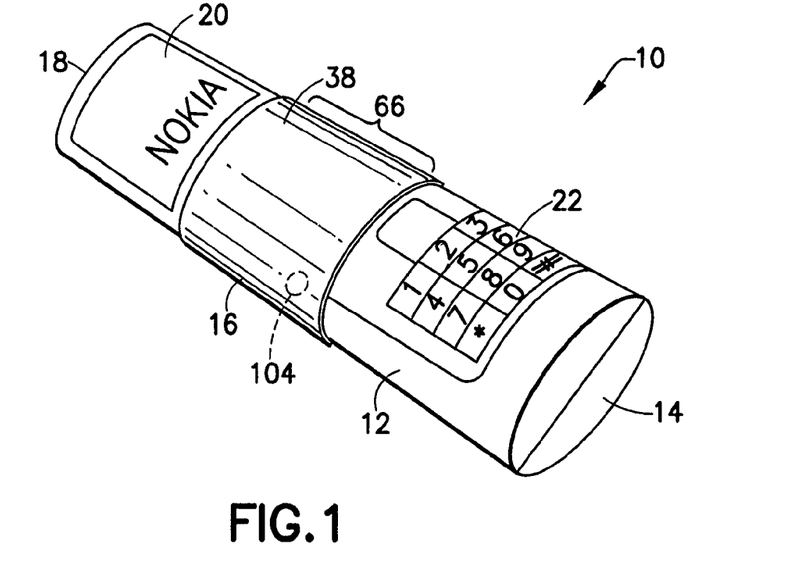
FIG. 1 is a perspective view of a hand-held portable electronic device incorporating features of the invention shown in a first configuration.

Referring to FIG. 1, there is shown a perspective view of a hand-held portable electronic device 10 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

Figure 2:
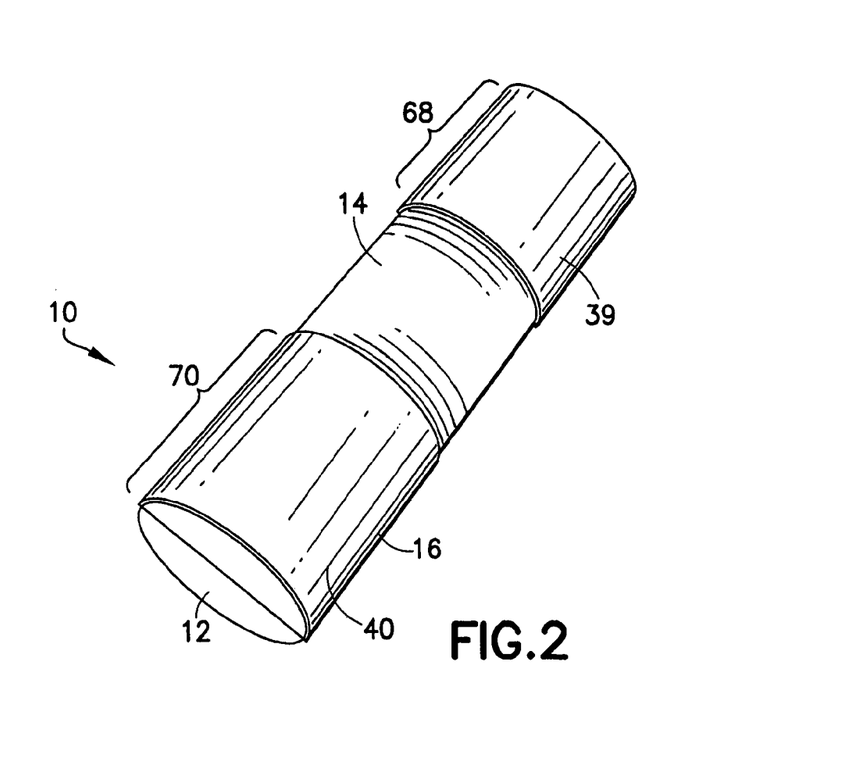
FIG. 2 is a perspective view of the device shown in FIG. 1 from an opposite direction.
Figure 3:
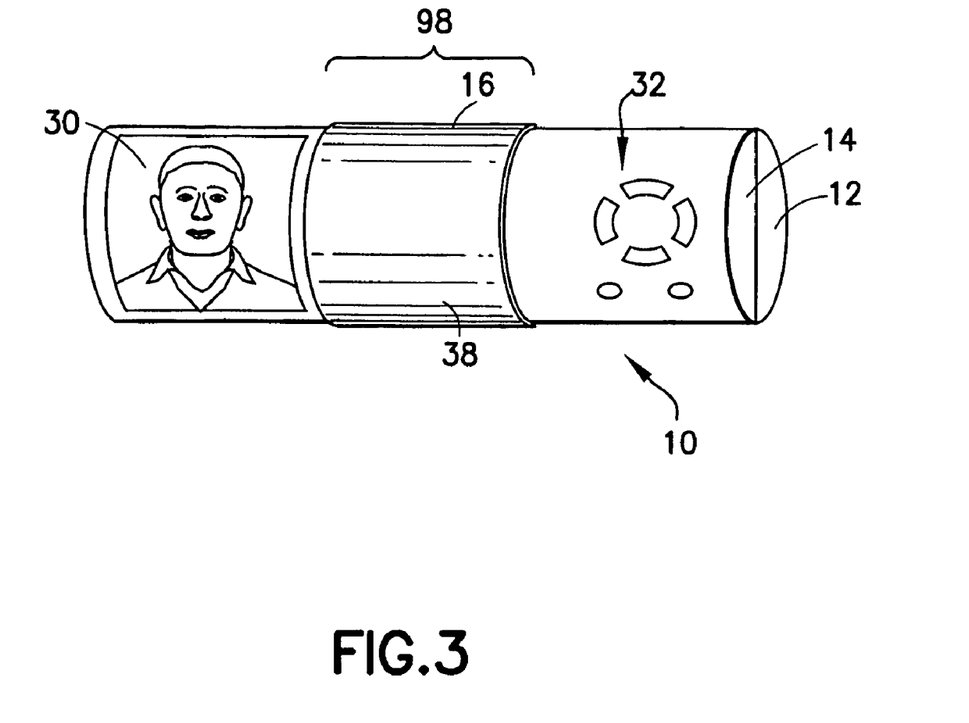
FIG. 3 is a perspective view of the device shown in FIG. 1 in a second configuration.
Figure 4:
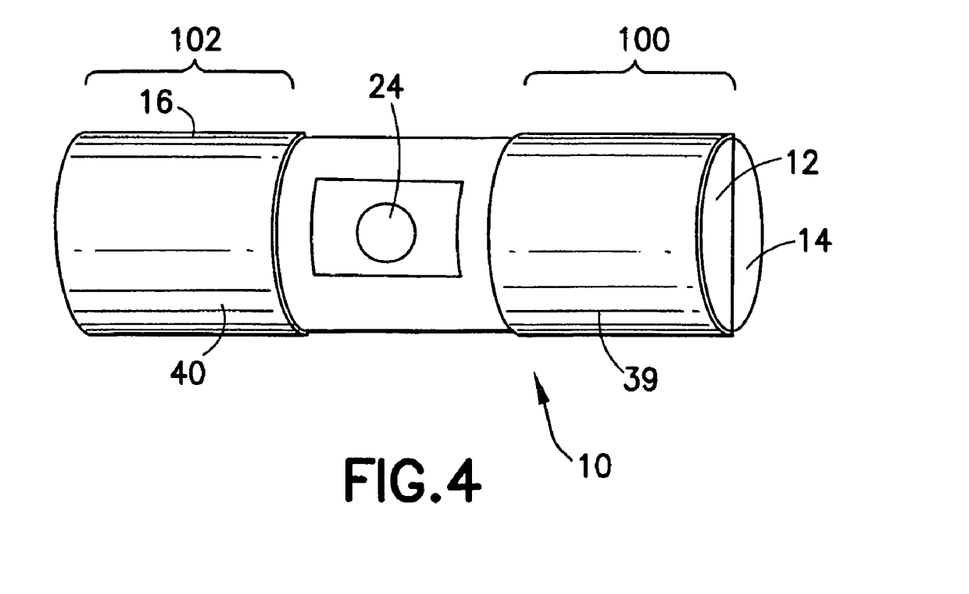
FIG. 4 is a perspective view of the device shown in FIG. 3 from an opposite direction.
Figure 5:
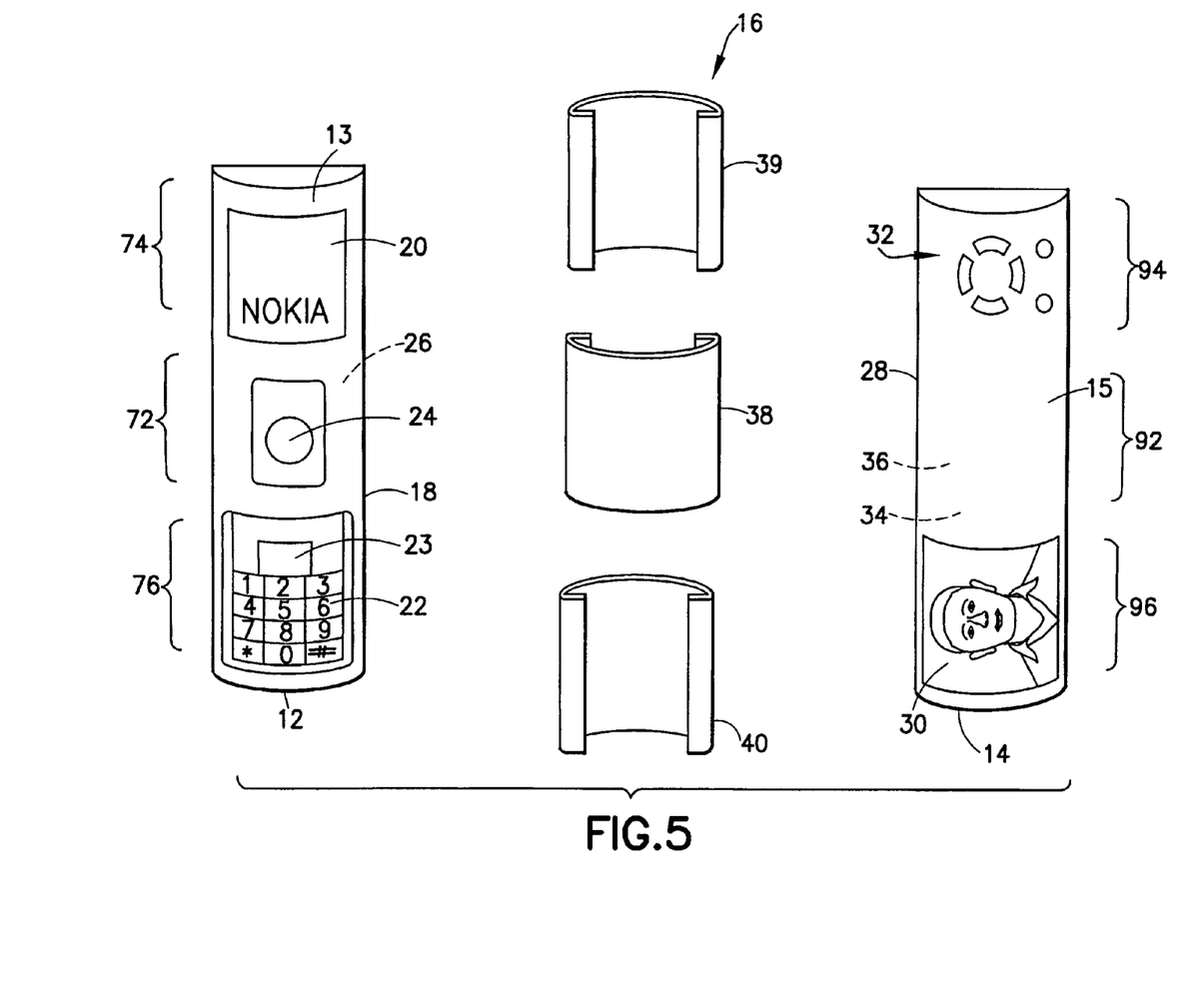
FIG. 5 is an exploded perspective view of the device shown in FIGS. 1-4.

The device 10 is a reconfigurable device. FIGS. 1 and 2 show the device 10 in a first configuration. FIGS. 3 and 4 shown the device 10 in a second different configuration. Referring also to FIG. 5, the device 10 generally comprises a first housing section 12, a second housing section 14 and a hinge arrangement 16. The hinge arrangement 16 movably connects the first and second housing sections 12, 14 to each other between the first and second configurations shown in FIGS. 1-2 and FIGS. 3-4.

In this embodiment the device is a multifunctional device comprising two primary functions or applications; a mobile telephone function and a camera function. Each form factor configuration is adapted to enable a user easier or more user friendly user interface for each primary function. In this exemplary embodiment the first configuration shown in FIGS. 1-2 is for friendly user interface with the mobile telephone function, and the second configuration shown in FIGS. 3-4 is for friendly user interface with the camera function. In alternate embodiments any suitable multiple functions could be provided, such as a mobile telephone and a gaming device, or a camera and a gaming device, or a mobile telephone and a music player similar to an IPOD® for example. In alternate embodiments more than two primary functions could be provided, and more than two configurations (one for each function) could be provided.

The first housing section 12 generally comprises a first housing member 18, an electronic display 20, a user input comprising a keypad 22, a camera 24 and electronic circuitry 26. The electronic circuitry 26 is operably coupled to the electronic display 20, the keypad 22, and the camera 24 and can comprise conventional mobile telephone and digital camera components including, for example, a transceiver, an antenna, a memory, a controller or processor, etc. In this embodiment the first housing section 12 has a general semi-column shape. However, in alternate embodiments any suitable shape could be provided including square or rectangular block shapes for example.

Referring particularly to FIG. 5, the display 20, the keypad 22 and the lens of the camera 24 are located at a major exterior side 13 of the first housing section 12; which is curved in this embodiment. The lens of the camera 24 is located in a middle section 72 of the first housing section 12. The display 20 is located in a top section 74 of the first housing section 12. The keypad 22 is located in a bottom section 76 of the first housing section 12. The keypad 22 and input device 23 allow a user to input telephone numbers and alphanumeric letters as is known in the mobile telephone art. The display 20 functions as a conventional mobile telephone display.

In this embodiment the second housing section 14 generally comprises a second housing member 28, a display 30, a user input section 32, electronic circuitry 34 and a battery 36. The second housing section 14 has a general semi-column shape. However, in alternate embodiments any suitable shape could be provided including square or rectangular block shaped for example. Referring particularly to FIG. 5, the display 30 and the user input or control 32 are located at a major exterior side 15 of the second housing section 14; which is curved in this embodiment. The user control 32 is located in a top section 94 of the second housing section 14. The display 30 is located in a bottom section 96 of the second housing section 14. The display 30 forms a display for the camera function of the device 10. The user input section 32 has user control and menu buttons for the camera function of the device 10.

The hinge arrangement 16 generally comprises three ribbons 38, 39, 40. In this embodiment the hinge arrangement forms a double acting hinge arrangement connecting the second housing section 12 to the first housing section 14. The double acting hinge arrangement 16 comprises the ribbons 38-40 to mechanically connect the first and second housing sections to each other. More specifically, in this embodiment the hinge arrangement forms a Jacob's Ladder flipping hinge arrangement. A Jacob's Ladder flipping hinge arrangement comprises a first ribbon which has a first end connected to a first member and a second end connected to a second member wherein the first ribbon wraps around an exterior side of the second member, and a second ribbon which has a first end connected to the second member and a second end connected to the first member wherein the second ribbon wraps around an exterior side of the first member. This forms two spaced hinges at opposite ends of the first and second members. The hinge movement will be further explained in the description below. A third ribbon is not necessarily needed, but is provided in the embodiments described to provided a hinge with less flexibility or play in the non-hinging-axes of the configuration. More than three ribbons could also be provided.

Figure 6:
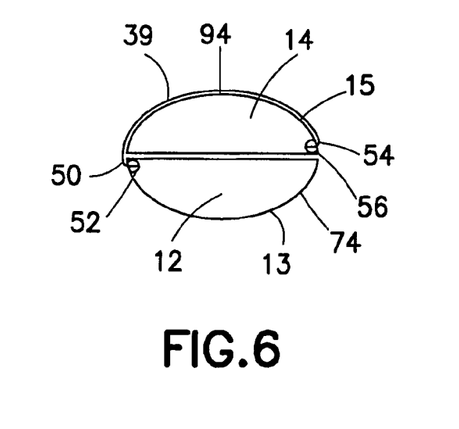
FIGS. 6-8 are schematic diagrams illustrating the location of the ribbons of the hinge assembly of the device in its configuration shown in FIGS. 1-2.
Figure 7:
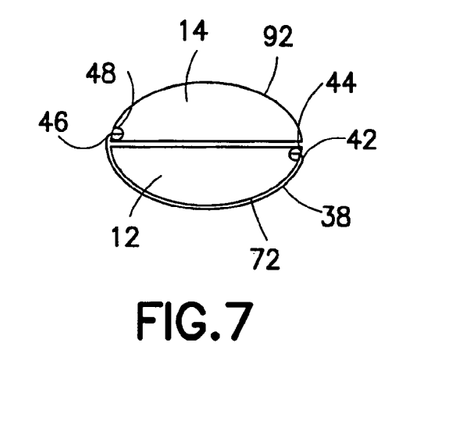

FIGS. 6-7 illustrate the location of the ribbons 38-39 relative to the first and second housing section 12, 14 in the first position shown in FIGS. 1-2. As seen in FIG. 7, the first ribbon 38 has a first end 42 connected to the first housing section 12 at connection 44, and an opposite second end 46 connected to the second housing section 14 at connection 48. As seen in FIG. 1, the first ribbon 38 wraps around the exterior facing side of the first housing section 12 at a middle swath 66. This covers the middle section 72. Thus, the first ribbon 38 covers the lens to the camera 24. Top and bottom sections 74, 76 of the first housing section 12 are not covered.

As seen in FIG. 6, the second ribbon 39 has a first end 50 connected to the first housing section 12 at connection 52, and an opposite second end 54 connected to the second housing section 14 at connection 56. As seen in FIG. 2, the second ribbon 39 wraps around the exterior facing side of the second housing section 14 at a top end swath 68. Thus, the second ribbon 39 covers the user input 32 for the camera function.

Figure 8:
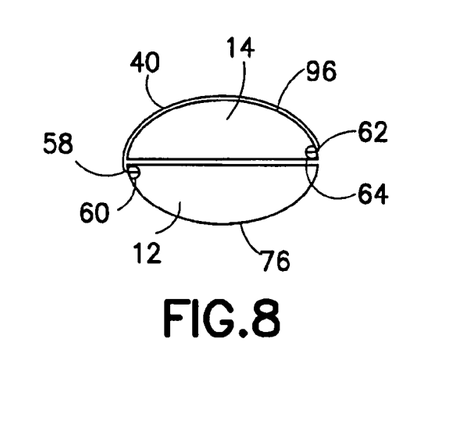

As seen in FIG. 8, the third ribbon 40 has a first end 58 connected to the first housing section 12 at connection 60, and an opposite second end 62 connected to the second housing section 14 at connection 64. As seen in FIG. 2, the third ribbon 40 wraps around the exterior facing side of the second housing section 14 at a bottom end swath 70. Thus, the third ribbon 40 covers the display 30 for the camera function. The top and bottom sections 94, 96 of the second housing section 14 are covered by the ribbons, but the middle section 92 of the second housing section 14 is not covered by the ribbons. In an alternate embodiment, the ribbons 38-40 might only cover portions for the components, such as only some of the buttons of the input 32 for example.

Figure 9:
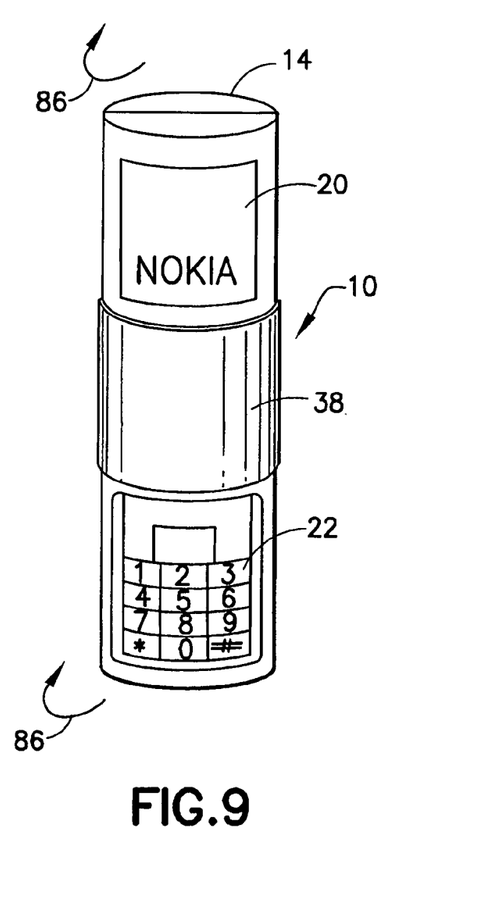
FIG. 9 is a perspective view of the device shown in FIG. 1.
Figure 10:
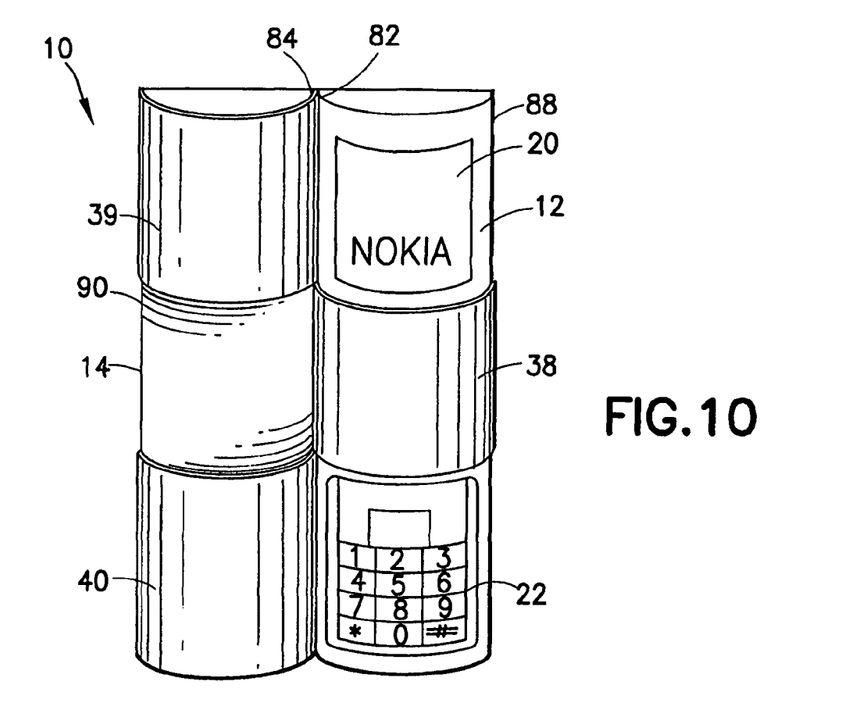
FIG. 10 is a perspective view of the device shown in FIG. 9 with the two housing sections rotated 180 degrees relative to each other with the hinge arrangement.
Figure 11:
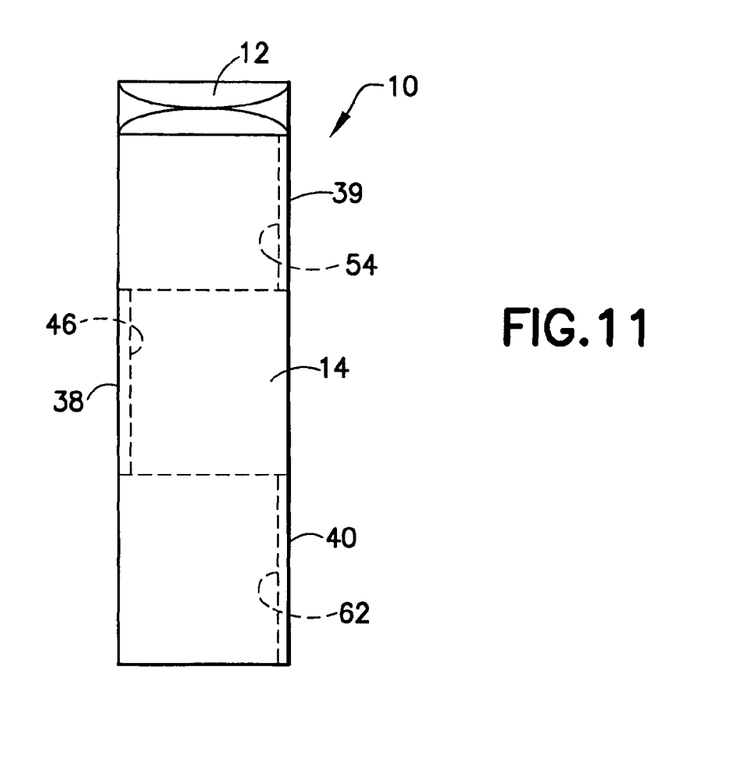
FIG. 11 is a perspective view of the device shown in FIG. 9 with the two housing section rotated 360 degrees relative to each other with the hinge arrangement to an intermediate position.
Figure 12:
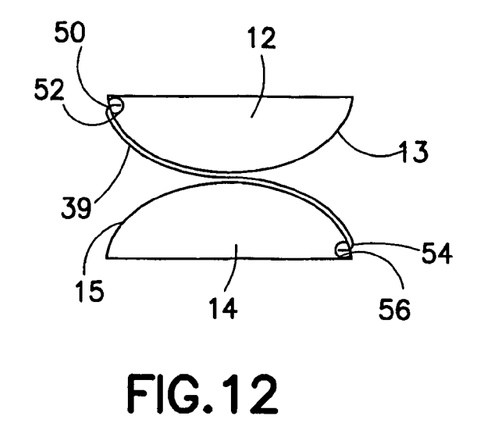
FIGS. 12-14 are schematic diagrams illustrating the location of the ribbons of the hinge assembly of the device in its configuration shown in FIG. 11.
Figure 13:
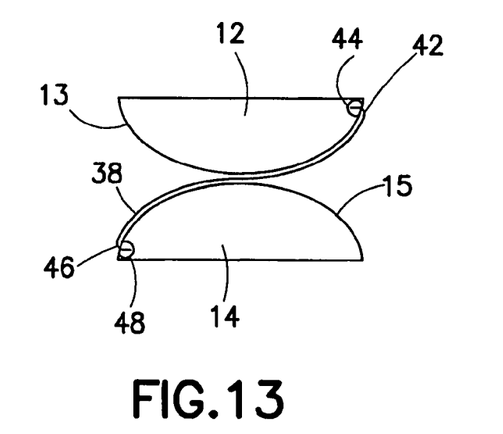
Figure 14:
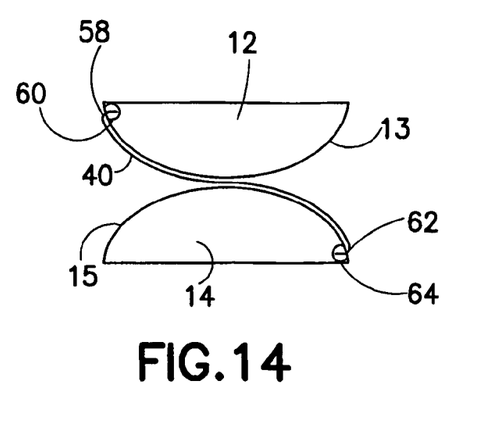

FIGS. 1-2 show the device 10 configured for use as a mobile telephone. Referring also to FIGS. 9 and 10, in order to reconfigure the device 10 for use as a camera as shown in FIGS. 3-4, the first and second housing sections 12, 14 are rotated relative to each other by the user as indicated by arrows 86. FIG. 10 shows the first and second housing sections 12, 14 rotated relative to each other 180 degrees from the position shown in FIGS. 1, 2 and 9. Lateral sides 82, 84 are still located near each other. The ribbons 38-40, because they are alternatingly wrapped on the housing sections 12, 14, keep the housing sections 12, 14 together. The ribbons 38-40 are flexible to allow them to change shape between curving in one direction or curving in an opposite direction. Any suitable material(s) could be used for the ribbons including an elastic material, a plastic material, a shape memory superelastic material, etc. However, in one type of embodiment at least one of the ribbons is an electrical flat flexible cable; or at least partially includes an electrical flat flexible cable. Each ribbon could include both rigid and flexible parts, and/or composite parts made of different materials.

Referring also to FIGS. 11-14, the first and second housing sections 12, 14 are shown rotated relative to each another 180 degrees from the position shown in FIG. 10; 360 degrees relative to the position shown in FIGS. 1-2 and 9. The ribbons 38-40 are partially wrapped around the major surface 13 and partially wrapped around the major surface 15. However, as seen in comparing FIG. 13 to FIGS. 12 and 14, the shapes are in alternating general S patterns.

Figure 15:
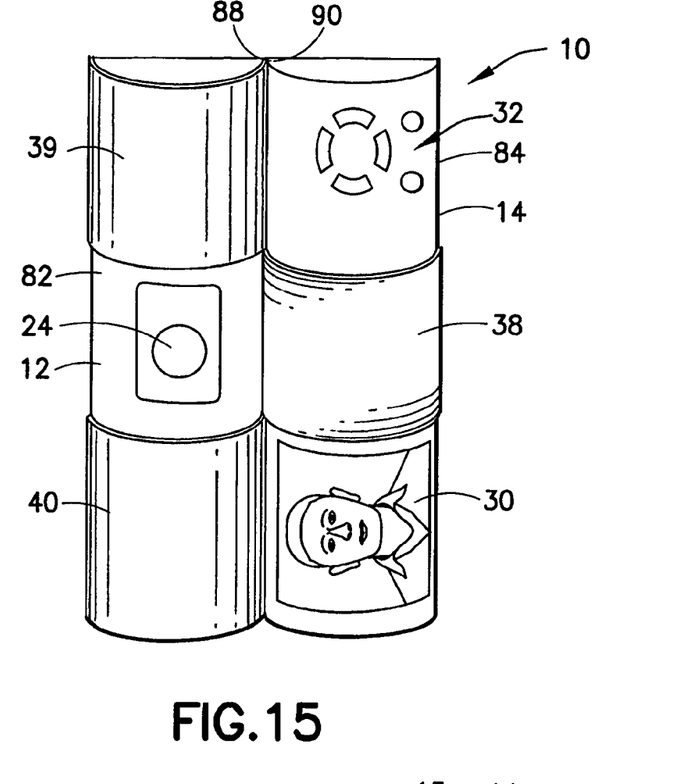
FIG. 15 is a perspective view of the device shown in FIG. 11 with the two housing sections rotated 180 degrees relative to each other from the intermediate position.
Figure 16:
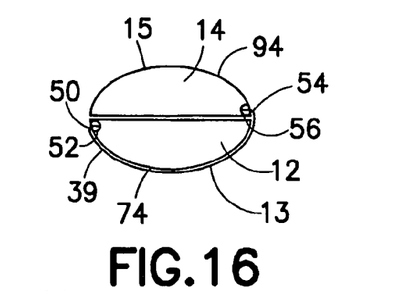
FIGS. 16-18 are schematic diagrams illustrating the location of the ribbons of the hinge assembly of the device in its configuration shown in FIGS. 3-4.
Figure 17:
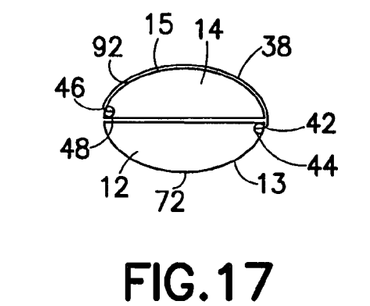
Figure 18:
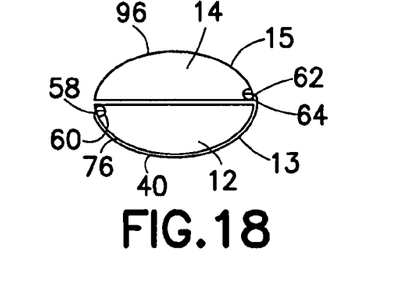

Referring also to FIG. 15, the device is shown with the first and second housing sections 12, 14 rotated another 180 degrees relative to the intermediate position shown in FIGS. 11-14. In this position the lateral sides 82, 84 are spaced from each other, but the opposite lateral sides 88, 90 are located next to each other.

Referring also to FIGS. 3-4 and 16-18, the device is shown with the first and second housing sections 12, 14 rotated another 180 degrees relative to the position shown in FIG. 15; 360 degrees relative to the position shown in FIGS. 11-14. As seen in FIG. 3, the first ribbon 38 wraps around the exterior facing side of the second housing section 14 at a middle swath 98. The first ribbon 38 covers the middle section 92 of the second housing section 14, but does not cover the middle section 72 of the first housing section 12. Thus, the lens of the camera 24 is uncovered. The second ribbon 39 covers the top section 74 of the first housing section 12, but does not cover the top section 94 of the second housing section 14. As seen in FIG. 4, the top ribbon 39 wraps around the exterior facing side of the first housing section 12 at a top swath 100. Thus, the display 20 is covered, but the user input or control 32 is not covered. The third ribbon 40 covers the bottom section 76 of the first housing section 12, but does not cover the bottom section 96 of the second housing section 14. As seen in FIG. 4, the third ribbon 40 wraps around the exterior facing side of the first housing section 12 at a bottom swath 102. Thus, the telephone keypad 22 is covered, but the display 30 for the camera is not covered. The device 10 is configured to be reoriented 90 degrees as shown in FIGS. 3 and 4 for picture taking; versus phone use orientation as shown in FIG. 9.

An electrical connection is preferably provided between the electronics in the two housing sections 12, 14. In a preferred embodiment this electrical connection comprises at least one of the ribbons 38-40 comprising an electrical flat flexible cable. The ends of the cable would be attached to the electronics in the two housing sections. Thus, the cable can provide electrical conductors between the two housing sections 12, 14 as well as a mechanical component of the hinge arrangement 16. In an alternate embodiment, separate electrical conductors could be connected to one or more of the ribbons 38-40 to electrically connect the housing sections 12, 14 to each other.

One or more of the electrical conductors in the ribbon(s) 38-40 could also be used as a switch to signal when the device 10 is in the first configuration shown in FIGS. 1-2 and/or the second configuration shown in FIGS. 3-4. For example, as shown in FIG. 1, a configuration signaling conductor on the ribbon 38 could be adapted to electrically contact a contact 104 on the exterior of the first housing section 12 to signal when the device 10 is in the phone mode. However, the contact 104 would not be contacted when the device 10 is in the camera mode. This is only one example. Any suitable type of switch to signal the electronic components of the device regarding the configuration of the device could be provided. In another embodiment one or more of the ribbons could form an antenna or shield for the device 10. For a ribbon which has electrical conductors, contact pads could be provided on the ribbon for electrically connecting the device 10 to a docking station, such as a telephone holder in an automobile, or a camera docking station connected to a personal computer.

With the invention, the "ribbons" can be used both as electrical flex cables and also as hiding elements for hiding different elements when the device is in different configurations. For example, hiding camera elements versus hiding phone elements. However, in an alternate embodiment the ribbons might not provide a hiding function and/or might not provide an electrical conductor function. The ribbons might just be used to change the color of the product or covering the phone when it is not in use. For example, first sides of the ribbons could be blue and second opposite sides of the ribbons could be red. Thus, the color could change between blue and red depending on its configuration. This is merely a simple example. Different patterns which visually interact with patterns on the exterior surfaces 13, 15 could also be provided, or different product use directions could be provided on different sides of the ribbons; camera directions on one side of the ribbons and phone directions on the opposite sides of the ribbons for example. In one type of alternate embodiment, one or more of the ribbons could have an aperture through it. The ribbons do not need to be uniformly solid in size and shape. In another type of alternate embodiment one or more of the ribbons could provide additional features such as providing a keypad or touchpad feature for example.

In the example described above the entire housing sections 12, 14 are flipped relative to each other. In an alternate embodiment, only a portion of the housing sections might be flipped relative to another housing section or housing section portion with the invention's Jacob's Ladder flipping hinge arrangement.

With the embodiment described above, the configuration shown in FIGS. 1-2 forms a first form factor operational configuration, and the configuration shown in FIGS. 3-4 forms a second form factor operational configuration. The first form factor operational configuration provides a configuration for using the telephone application of the device. The second form factor operational configuration provides a configuration for using the camera application of the device. The two form factor operational configurations avoid the confusion noted above in conventional multi-application devices by hiding controls and user interfaces of applications not being used. The first and second housing sections are adapted to be moved relative to each other to provide the first form factor operational configuration and the second form factor operational configuration, wherein the device is adapted to function as the mobile telephone when the device is in the first form factor operational configuration, and wherein the device is adapted to function as the at least one other non-telephone application when the device is in the second form factor operational configuration. In alternate embodiments the portable hand held device might not comprise a telephone form factor operational configuration. For example, the first form factor operational configuration could comprise a camera and the second form factor operational configuration could comprises a gaming device. Other variations should be apparent to those skilled in the art after reading of the patent application.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A hand-held portable electronic device comprising:
   a housing comprising a first housing section and a second housing section;
   electronic circuitry in the housing; and
   a flipping hinge arrangement connecting the first and second housing sections to each other, wherein the first and second housing sections are adapted to be flipped more than 360 degrees relative to each other at the flipping hinge arrangement.

2. A hand-held portable electronic device as in claim 1 wherein the electronic circuitry comprises a transceiver and a camera.

3. A hand-held portable electronic device as in claim 1 wherein the electronic circuitry comprises a transceiver and the electronic circuitry is configured to play a music file as a music player.

4. A hand-held portable electronic device as in claim 1 wherein the device comprises a mobile telephone including a transceiver and the electronic circuitry is configured to provide at least one other non-telephone application.

5. A hand-held portable electronic device as in claim 4 wherein the first and second housing sections are adapted to be moved relative to each other to provide a first form factor operational configuration and a second form factor operational configuration, wherein the device is adapted to function as the mobile telephone when the device is in the first form factor operational configuration, and wherein the device is adapted to function as the at least one other non-telephone application when the device is in the second form factor operational configuration.

6. A hand-held portable electronic device as in claim 1 wherein the first and second housing sections comprises general semi-column shapes.

7. A hand-held portable electronic device as in claim 1 wherein the flipping hinge arrangement comprises at least three separate ribbons individually connecting the first and second housing sections to each other.

8. A hand-held portable electronic device as in claim 7 wherein a first one of the ribbons is located on opposite major sides of the first and second housing sections than second and third ones of the ribbons.

9. A hand-held portable electronic device as in claim 8 wherein the second and third ribbons are located on opposite sides of the first ribbon.

10. A hand-held portable electronic device as in claim 7 wherein at least one of the ribbons comprises an electrical flat flexible cable electrically coupled to the electronic circuitry.

11. A hand-held portable electronic device as in claim 1 wherein the flipping hinge arrangement is configured to allow a user to flip the first housing section in a first direction about 360 degrees relative to the second housing section at a first end of the housing from a first form factor operation position to an intermediate position, and wherein the flipping hinge arrangement is configured to allow a user to flip the first housing section relative to the second housing section at a second end of the housing in the same first direction about 360 degrees from the intermediate position to a second form factor operational position.

12. A hand-held portable electronic device as in claim 1 wherein the first housing section comprises a first user interface section on an exterior side which is not covered by a ribbon of the flipping hinge arrangement when the hand-held portable electronic device is in a first form factor operational position, and wherein the first user interface section is covered by the ribbon when the hand-held portable electronic device is in a second form factor operational position.

13. A hand-held portable electronic device as in claim 12 wherein the second housing section comprises a second user interface section on an exterior side which is covered by another ribbon of the flipping hinge arrangement when the hand-held portable electronic device is in the first form factor operational position, and wherein the second user interface section is not covered by said another ribbon when the hand-held portable electronic device is in the second form factor operational position.

14. A hand-held portable electronic device as in claim 1 wherein the second housing section comprises a camera lens on an exterior side which is covered by a ribbon of the flipping hinge arrangement when the hand-held portable electronic device is in a first form factor operational position, and wherein the camera lens is not covered by the ribbon when the hand-held portable electronic device is in a second form factor operational position.

15. A hand-held portable electronic device as in claim 1 wherein the first housing section comprises a keypad on an exterior side which is not covered by a ribbon of the flipping hinge arrangement when the hand-held portable electronic device is in a first form factor operational position, and wherein the keypad is covered by the ribbon when the hand-held portable electronic device is in a second form factor operational position.

16. A hand-held portable electronic device as in claim 1 wherein the first housing section comprises a first display and the second housing section comprises a second display, and wherein ribbons of the flipping hinge arrangement alternatively cover the first and second displays when the device is in respective first and second form factor operational positions.

17. A hand-held portable electronic device comprising:
   a first housing section having electronic circuitry;
   a second housing section; and
   a double acting hinge arrangement connecting the second housing section to the first housing section such that the first and second housing sections are adapted to rotate more than 360 degrees relative to each other by the double acting hinge arrangement, wherein the double acting hinge arrangement comprises a ribbon mechanically connecting the first and second housing sections to each other.

18. A hand-held portable electronic device as in claim 17 wherein the first and second housing sections are adapted to be moved relative to each other to provide a first form factor operational configuration and a second form factor operational configuration.

19. A hand-held portable electronic device as in claim 17 wherein the electronic circuitry comprises a transceiver and wherein the second housing section comprises a camera.

20. A hand-held portable electronic device as in claim 17 wherein the double acting hinge arrangement comprises a Jacob's Ladder flipping hinge arrangement connecting the first and second housing sections to each other.

21. A hand-held portable electronic device as in claim 17 wherein the second housing section comprises electronic circuitry and wherein the ribbon comprises an electrical flat flexible cable electrically connected to the electronic circuitry in the second housing section to the electronic circuitry in the first housing section.

22. A hand-held portable electronic device as in claim 17 wherein the hinge arrangement is configured to allow a user to flip the first housing section in a first direction about 360 degrees relative to the second housing section at first ends of the housing sections from a first form factor operation position to an intermediate position, and wherein the hinge arrangement is configured to allow the user to flip the first housing section relative to the second housing section at second ends of the housing sections in the first direction about 360 degrees from the intermediate position to a second different form factor operational position.

23. A hand-held portable electronic device as in claim 17 wherein the first housing section comprises a first user interface section on an exterior side which is not covered by a ribbon of the hinge arrangement when the hand-held portable electronic device is in a first form factor operational position, and wherein the first user interface section is covered by the ribbon when the hand-held portable electronic device is in a second form factor operational position.

24. A hand-held portable electronic device as in claim 23 wherein the second housing section comprises a second user interface section on an exterior side which is covered by another ribbon of the hinge arrangement when the hand-held portable electronic device is in the first form factor operational position, and wherein the second user interface section is not covered by said another ribbon when the hand-held portable electronic device is in the second form factor operational position.

25. A hand-held portable electronic device as in claim 17 wherein the second housing section comprises a camera lens on an exterior side which is covered by a ribbon of the hinge arrangement when the hand-held portable electronic device is in a first form factor operational position, and wherein the camera lens is not covered by the ribbon when the hand-held portable electronic device is in a second form factor operational position.

26. A hand-held portable electronic device as in claim 17 wherein the first housing section comprises a keypad on an exterior side which is not covered by a ribbon of the hinge arrangement when the hand-held portable electronic device is in a first form factor operational position, and wherein the keypad is covered by the ribbon when the hand-held portable electronic device is in a second form factor operational position.

27. A hand-held portable electronic device as in claim 17 wherein the first housing section comprises a first display and the second housing section comprises a second display, and wherein ribbons of the hinge arrangement alternatively cover the first and second displays when the device is in respective first and second form factor operational positions.

28. A hand-held portable electronic device comprising:
a housing comprising a first housing section and a second housing section;
electronic circuitry in the housing; and
at least three ribbons mechanically connecting the first and second housing sections to each other, wherein at least one of the ribbons comprises an electrical flat flexible cable connected to the electronic circuitry, and wherein the ribbons are connected to the first and second housing sections to allow the first and second housing sections to be flipped in a first direction about 360 degrees relative to each other at a first hinge location and flipped past the 360 degrees relative to each other in the first direction at a second spaced hinge location between a first form factor operational configuration and a second form factor operational configuration.

29. A method of reconfiguring a hand-held portable electronic device comprising:
flipping a first housing section of a housing in a first direction about 360 degrees relative to a second housing section of the housing at a first end of the housing from a first form factor operation position to an intermediate position; and
flipping the first housing section relative to the second housing section at a second end of the housing in the same first direction about 360 degrees from the intermediate position to a second form factor operational position.

30. A method as in claim 29 wherein flipping the first housing section comprises moving ribbons of a Jacob's Ladder flipping hinge arrangement connecting the first and second housing sections to each other.

31. A method of assembling a hand-held portable electronic device comprising:
connecting a first housing section to a second housing section by a first ribbon; and
connecting a second ribbon and a third ribbon to the first and second housing sections on opposite sides of the first ribbon, wherein the first ribbon is located on opposite major sides of the first and second housing sections than the second and third ribbons.

32. A method as in claim 31 wherein at least one of the ribbons is an electrical flat flexible cable wherein connecting comprises electrically coupling electronic circuitry in the first housing section to electronic circuitry in the second housing section by the cable.

* * * * *